US008320645B2

(12) United States Patent
Maase

(10) Patent No.: US 8,320,645 B2
(45) Date of Patent: Nov. 27, 2012

(54) HIGH PERFORMANCE MULTI-MODE PALMPRINT AND FINGERPRINT SCANNING DEVICE AND SYSTEM

(75) Inventor: Daniel Frederick Maase, Plymouth, MN (US)

(73) Assignee: Identix Incorporated, Bloomington, MN (US)

( * ) Notice: Subject to any disclaimer, the term of this patent is extended or adjusted under 35 U.S.C. 154(b) by 962 days.

(21) Appl. No.: 12/204,558

(22) Filed: Sep. 4, 2008

(65) Prior Publication Data

US 2009/0103788 A1   Apr. 23, 2009

Related U.S. Application Data

(60) Continuation-in-part of application No. 11/698,601, filed on Jan. 25, 2007, now Pat. No. 7,455,424, which is a division of application No. 11/261,401, filed on Oct. 27, 2005, now Pat. No. 7,199,868.

(60) Provisional application No. 60/967,601, filed on Sep. 4, 2007, provisional application No. 60/624,644, filed on Nov. 2, 2004.

(51) Int. Cl.
G06K 9/00 (2006.01)
(52) U.S. Cl. .................. 382/124; 382/126; 382/127
(58) Field of Classification Search .................. 382/124, 382/126, 127
See application file for complete search history.

(56) References Cited

U.S. PATENT DOCUMENTS

| | | | |
|---|---|---|---|
| 3,702,731 A * | 11/1972 | Wood | 355/18 |
| 4,933,976 A * | 6/1990 | Fishbine et al. | 382/127 |
| 4,975,808 A | 12/1990 | Bond et al. | |
| 5,396,350 A | 3/1995 | Beeson et al. | |
| 5,416,573 A | 5/1995 | Sartor, Jr. | |
| 5,483,601 A * | 1/1996 | Faulkner | 382/115 |
| 5,528,355 A * | 6/1996 | Maase et al. | 356/71 |
| 5,748,766 A | 5/1998 | Maase et al. | |
| 5,854,872 A | 12/1998 | Tai | |
| 5,986,746 A * | 11/1999 | Metz et al. | 356/71 |
| 5,991,431 A | 11/1999 | Borza et al. | |
| 6,061,463 A * | 5/2000 | Metz et al. | 382/124 |

(Continued)

FOREIGN PATENT DOCUMENTS

JP      11-202208      7/1999

(Continued)

OTHER PUBLICATIONS

Ribaric, S.; Ribaric, D.; Pavesic, N.; , "Multimodal biometric user-identification system for network-based applications," Vision, Image and Signal Processing, IEE Proceedings—, vol. 150, No. 6, pp. 409-416, Dec. 15, 2003.*

(Continued)

*Primary Examiner* — Bhavesh Mehta
*Assistant Examiner* — Utpal Shah
(74) *Attorney, Agent, or Firm* — Weaver Austin Villeneuve & Sampson LLP

(57) ABSTRACT

Systems, devices and methods for providing rolled fingerprint capture and palm capture capability in a device having reduced size are provided. In certain embodiments, the systems and methods provide capture of rolled fingerprints, slap fingerprints and palm prints in one continuous workflow in a compact device. In certain embodiments, moisture discriminating optics and/or enhanced definition image formation previously achieved only in devices designed for capturing only fingerprints are provided. In certain embodiments, the systems employ a single scanning device to capture 500 ppi and/or 1000 ppi palm and fingerprint images.

18 Claims, 10 Drawing Sheets

U.S. PATENT DOCUMENTS

| | | | |
|---|---|---|---|
| 6,115,484 A * | 9/2000 | Bowker et al. | 382/127 |
| 6,175,407 B1 * | 1/2001 | Sartor | 356/71 |
| 6,285,099 B1 | 9/2001 | Takami | |
| 6,331,915 B1 | 12/2001 | Myers | |
| 6,755,548 B2 | 6/2004 | Ho | |
| 6,883,925 B2 | 4/2005 | Leu et al. | |
| 6,912,300 B1 * | 6/2005 | Okamoto et al. | 382/127 |
| 7,036,946 B1 | 5/2006 | Mosier | |
| 7,040,794 B2 | 5/2006 | Bernard | |
| 7,199,868 B2 | 4/2007 | Maase et al. | |
| 7,455,424 B2 | 11/2008 | Maase et al. | |
| 7,742,626 B2 * | 6/2010 | Kamata et al. | 382/115 |
| 2003/0118219 A1 | 6/2003 | Higuchi et al. | |
| 2004/0228508 A1 * | 11/2004 | Shigeta | 382/124 |
| 2005/0047632 A1 * | 3/2005 | Miura et al. | 382/124 |
| 2005/0243575 A1 | 11/2005 | Kunimochi | |
| 2007/0116331 A1 | 5/2007 | Rowe et al. | |
| 2007/0121098 A1 | 5/2007 | Maase et al. | |
| 2008/0007172 A1 | 1/2008 | Tan et al. | |
| 2009/0080709 A1 * | 3/2009 | Rowe et al. | 382/115 |

FOREIGN PATENT DOCUMENTS

| | | |
|---|---|---|
| JP | 2000-092316 | 3/2000 |
| JP | 2001-256487 | 9/2001 |
| JP | 2002-236328 | 8/2002 |
| JP | 2003-037708 | 2/2003 |
| JP | 2003-044838 | 2/2003 |
| JP | 2003-060844 | 3/2003 |
| JP | 2003-513314 | 4/2003 |
| JP | 2004-266125 | 9/2004 |
| JP | 2001-208976 | 8/2011 |
| WO | WO 01/031563 | 5/2001 |
| WO | WO 2004/013724 | 2/2004 |

OTHER PUBLICATIONS

Notice of Allowance for related U.S. Appl. No. 11/261,401 dated Dec. 27, 2006.

Allowed Claims for related U.S. Appl. No. 11/261,401, Feb. 12, 2009.

International Search Report and Written Opinion of the International Searching Authority dated Feb. 13, 2007, for related PCT Application No. PCT/US2005/39415.

Office Action mailed Aug. 29, 2007 for related U.S. Appl. No. 11/698,601.

Final Office Action mailed Apr. 28, 2008 for related U.S. Appl. No. 11/698,601.

Notice of Allowance for related U.S. Appl. No. 11/698,601 dated Jul. 21, 2008.

Allowed Claims for related U.S. Appl. No. 11/698,601, Feb. 12, 2009.

Provisional Application dated Sep. 4, 2007, U.S. Appl. No. 60/967,550, entitled "High Performance Multi-Mode Palmprint and Fingerprint Scanning Device and System."

Provisional Application dated Sep. 4, 2007, U.S. Appl. No. 60/967,601, entitled "High Performance Multi-Mode Palmprint and Fingerprint Scanning Device and System."

International Search Report and Written Opinion of the International Searching Authority dated Nov. 18, 2008, for related PCT Application No. PCT/US 08/75246.

EP Search Report dated Jun. 4, 2009 for related Application No. 05825148.9.

EP Supplemental Search Report dated Sep. 28, 2009 for related Application No. 05825148.9.

EP Office Action darted Dec. 7, 2010 for related Application No. 05825148.9.

JP Office Action dated Dec. 21, 2010 for related Application No. 2007-539288.

JP Decision of Rejection and Dismissal dated Jan. 10, 2012 for related Application No. 2007-539288.

Maltoni "Handbook of Fingerprint 7, 9, Recognition" Chapter 2, Jan. 1, 2003, pp. 59-64.

Smith "Modern Optical Engineering 2d Ed. Passage" Modern Optical Engineering, Chapter 3, Jan. 1, 2000, pp. 417, 427.

RU Office Action dated Apr. 11, 2012, issued in Application No. 2010112844/08(018082) with English translation.

* cited by examiner

HIGH PERFORMANCE MULTI-MODE PALMPRINT AND FINGERPRINT SCANNING DEVICE AND SYSTEM

CROSS-REFERENCE TO RELATED APPLICATIONS

This application claims benefit under 35 U.S.C. 119(e) of Provisional Application No. 60/967,601, entitled "HIGH PERFORMANCE MULTI-MODE PALMPRINT AND FINGERPRINT SCANNING DEVICE AND SYSTEM." This application is also a continuation-in-part of copending U.S. patent application Ser. No. 11/698,601 (published as 20070121098) filed Jan. 25, 2007, which is a divisional of U.S. patent application Ser. No. 11/261,401 (issued as U.S. Pat. No. 7,199,868), filed Oct. 27, 2005, which in turn claims benefit of U.S. Provisional Patent Application 60/624,644, filed Nov. 2, 2004. All of these applications are incorporated by reference herein in their entireties.

BACKGROUND

Fingerprint imaging systems apply the known contact method of creating a fingerprint pattern in which a surface topography of a finger is approximated by a series of ridges with intermediate valleys. Conventional full hand image capture devices that capture a full hand image of fingerprints and palm require moving the hand across a cylindrical drum or platen to capture hand and palm ridge formation data. This requires significant operator skill. Furthermore, the technical system employed to capture such images uses a line array sensor which is not suitable for capturing rolled fingerprints. There are palm capture devices that employ a fixed platen prism in combination with a moving line array mechanism. This system requires less operator skill, but captures only a palm image.

Other hand/palm image capture systems exist that employ a cone-shaped hand receiving surface in combination with a moving optical/imager system to form a hand/palm image. However, this system is ergonomically and electronically not capable of scanning rolled fingerprints. Additionally, it is physically very large requiring a cabinet of large dimensions to house the required mechanism and requires substantial operating power to move the mechanism in a controlled fashion and to heat the cone-shaped hand receiving surface to avoid condensation from moist hands.

Systems employing two scanning devices, one for palm and slap fingerprint capture and one for rolled fingerprint capture have been employed; however these are physically large and heavy, and by virtue of the two scanners are expensive to manufacture. Moreover these devices require substantial power to operate, in part due to the need to heat the large prisms to avoid condensation from moist hands.

Systems utilizing a light pipe illumination scheme have been employed. However, the surface illuminated is relatively small and the light pipe structure constructed with a small number of LED light sources applied to the side of the light pipe. To receive the light from the LEDs, the light pipe thickness required in these systems is large, limiting the ergonomic design of the device housing for accommodating finger position beneath the prism illumination face.

SUMMARY

In one aspect the invention features systems, devices and methods for providing rolled fingerprint capture and palm capture capability in a device having reduced size. In certain embodiments, the systems and methods provide capture of rolled fingerprints, slap fingerprints and palm prints in one continuous workflow in a compact device. In certain embodiments, moisture discriminating optics and/or enhanced definition image formation previously achieved only in devices designed for capturing only fingerprints are provided. In certain embodiments, the systems employ a single scanning device to capture 500 ppi and/or 1000 ppi palm and fingerprint images.

In one aspect, the invention features a system for optically imaging an object. The system includes an optical platen having an object receiving surface large enough to image a palm. A light source is positioned to illuminate the object receiving surface. An imaging system having an image plane is positioned to receive light from the object receiving surface to form an image of the object on the object receiving surface. A lens mechanism is provided to focus light from the object receiving surface onto the image plane. In various embodiments, the system provides an optics system that provides a high modulation transfer function (MTF) over a field of view sufficient to capture an FBI Appendix F compliant palm image plus high MTF in the lower region of the field of view for imaging FBI appendix compliant rolled finger images. In certain embodiments, the lower region includes the left and right corners of the object receiving surface.

Various implementations of the invention may include one or more of the following features. The imager provides region of interest region of interest addressability suitable to define a rolled finger region in an ergonomically acceptable region of the field of view (FOV) and provides a frame rate in this region of greater than 12 fps. According to various embodiments, the lens mechanism includes multiple lens elements, in one embodiment two doublets and two singlets. The lens mechanism removes a substantial portion of chromatic aberration. The lens mechanism includes an aperture. The system may further includes one or more folding mirrors to direct light from the object receiving surface to the lens mechanism. The system in certain embodiments incorporates three folding mirrors. The system may include a monochromatic CMOS imager. The imager is tilted at an angle from a normal. In other embodiments, the system includes either a CCD or CMOS imager. The system produces 500 and 1,000 pixels per inch images. The system is configured to capture at least four-finger slap, single-finger slap, and rolled fingerprint images. Also in certain embodiments, the optics system requires no geometric distortion correction in software and does not image moisture.

In another aspect of the invention, an illumination scheme that provides uniform illumination across the field of view and is mechanically thin to enable an optimal ergonomic undercut sufficient for finger and thumb movement when rolling fingerprints is provided.

The details of one or more embodiments are set forth in the accompanying drawings and the description below. Other features, objects and advantages will be apparent from the description and drawings, and from the claims.

DETAILED DESCRIPTION

As an identifier that cannot be forgotten or lost, the palmprint and fingerprint device and systems described herein have a wide range of application that is constantly expanding. For example, palmprints and fingerprints may be used as access keys.

A palmprint and fingerprint imaging device may be used to capture four-finger slap, single-finger slap, and rolled fingerprint images as well as to capture palm and full-hand images. In certain embodiments, such a device produces 1000 pixels per inch (ppi) images as well as 500 ppi images. The images meet or exceed the specified requirements or standards, for example, the FBI Electronic Fingerprint Transmission Specification (CJIS-RS-0010) Appendix F requirements, at all stimulus frequencies up to and including the frequency where sampling engenders aliasing. The palm and fingerprint imaging device also supports higher resolution images and is compatible with evolving standards.

Figure 1:
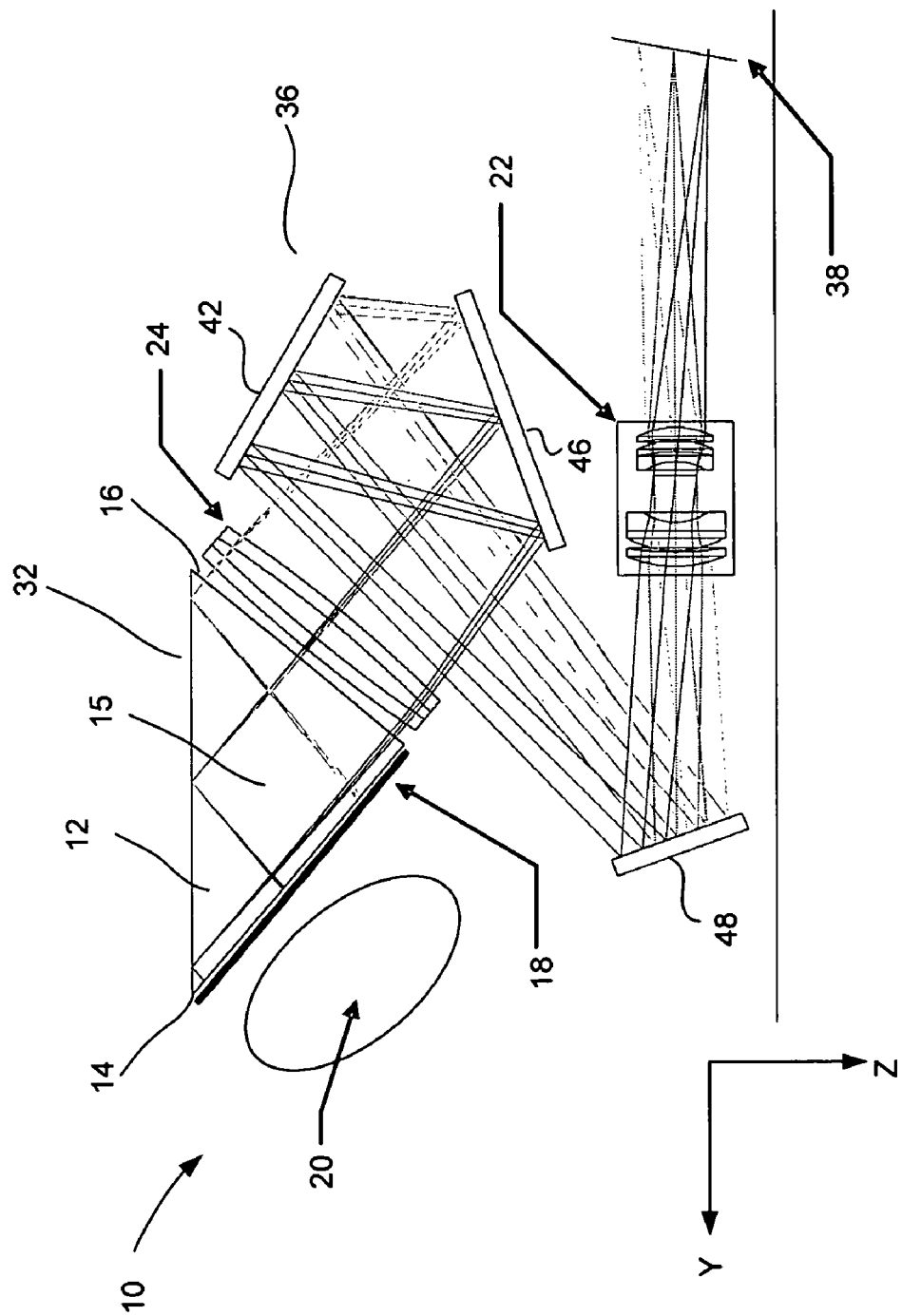
FIG. 1 shows schematically a side sectional view of an imaging system according to certain embodiments of the present invention.

FIG. 1 shows a palmprint and fingerprint system 10. While previous palmprint and fingerprint systems utilize a two-camera system to image (1) palms/slap fingerprints and (2) rolled fingerprints, the system 10 enables the use of a single low frame rate, region of interest (ROI) addressable imager in combination with large field of view (FOV) optics and structurally thin prism illumination source to accomplish the capture of palm prints, slap fingerprints and rolled fingerprints in a single low cost physically compact device. This system provides the ability to achieve high imaging performance across the required field of view with particular attention to the lower region of the field of view where rolled fingerprints must be captured due to ergonomic limitations and where performance typically degrades due to conventional optics designs. According to various embodiments, the system incorporates functionally desirable features, e.g., moisture discriminating optics and high contrast enhanced definition, by means of oversampling and optics with a very small blur spot.

As shown in FIG. 1, system 10 includes an optical plate or platen 32, a primary lens 24, a mirror system 36, an objective lens system 22, an image sensor system 38, and an illumination source 18. For reference, directions Y and Z of the orthogonal coordinate system are shown on FIG. 1 by arrows. A third direction X of this orthogonal coordinate system is perpendicular to the drawing plane of FIG. 1. An object receiving surface 12 includes the object plane of the system and is one surface of a prism 15. An object, such as a palm or one or more fingers, to be identified is applied to the surface 12. Another surface 14 of the prism is configured to receive a source of illumination for the object plane surface 12. The object plane surface 12 may include finger field regions to interface with the finger skin ridges and valleys and palm regions to interface with palm skin ridges and valleys. The object receiving surface 12 has an optically smooth surface to provide good contact with the skin ridges. According to various embodiments, the object receiving surface is large enough to provide sufficient X-Y dimensions to image a palm as well as rolled fingerprint images. In certain embodiments, the object receiving surface is large enough to provide sufficient dimensions to image a palm as well as up to four fingerprints at the same time, as well as rolled fingerprint images. The surface of the object receiving surface in the X-Y plane may, for example, be about 127 millimeters (mm) in length (the X-direction) and about 127 mm in width (the Y-direction). The third face 16 of the prism is the viewing face through which the illuminated object plane is viewed by total internal reflection (TIR). When a palm or finger is applied to the object plane 12, palm or finger friction ridge detail is viewed by frustrated internal reflection (FTIR). The object receiving surface 12 and surfaces 14 and 16 are planar in shape. Other shapes are possible for either or both of these surfaces, such as, for example, cylindrical shapes, to enhance various characteristics of the images.

The surface 14 is configured to receive a source of illumination for the object plane surface 12. The surface 16 also is the viewing face through which the illuminated object plane is viewed by TIR. The surface 14 is inclined to the object receiving surface at an angle, as shown in FIG. 1. The value of this angle is generally chosen to accomplish the desired illumination of the object plane. The surface 16 is inclined to the object receiving surface. The object plane surface 12 is illuminated through the illumination face 14 of the prism at an angle in the approximately equal to the viewing angle (25-50°). The angles between the object plane surface 12 and the surface 16, and between the surface 12 and the surface 14 may be, in one embodiment, approximately 40 and 50°, respectively. This embodiment represents bright field illumination. Dark field illumination whereby the object plane is illuminated at an angle approximating 90° may also be utilized. In this case, the finger friction ridges are seen as a bright object on the dark field background. The dark field implementation may be preferable in some cases where packaging of the optics dictates that the illumination be provided from other than a front surface of the object plane prism or plate.

A primary lens 24 is positioned external to the optical plate 32 and behind its lateral surface 16. The primary lens 24 may include, for example, a square field lens. The field lens accomplishes telecentricity of rays at the object plane. The lens directs light from the object plane to the objective lens system 22. In a particular embodiment, the field lens is an equi-convex lens with the following specifications: radius: 513.500 mm cx, 513.500 mm cx; edge diameter: 96.0×144.0; thickness: 18.000 mm; material: F2.

When a finger and/or palm is applied to the object plane, finger ridge detail is viewed by frustrated total internal reflection (FTIR). The optical plate or prism in one embodiment employs the principle of moisture discrimination whereby the index of the refraction of the glass and the viewing angle of the object plane can discriminate the index of refraction of skin from that of both air and water at the object plane surface. This technique is described in U.S. Pat. No. 5,416,573, entitled "Apparatus For Producing Fingerprint Images Which Are Substantially Free Of Artifacts Attributable To Moisture On The Finger Being Imaged", assigned to the assignee of the subject application, and which is herein incorporated by reference.

Specifically, in one embodiment, the image sensor system 38 receives light from the platen surface where air or water is in contact with that surface, but receives significantly less light from regions of the platen surface where friction ridge skin is in contact. Generally, moisture discrimination is implemented with high index of refraction glass to implement TIR with acceptable geometric distortion. Lower index glass is also feasible with associated techniques to correct for geometric distortion and provide acceptable contrast transfer function (CTF) at the associated steeper viewing angle.

The prism may comprise SF-11 glass (index of refraction=1.785) readily available from high quality glass fabricators. The viewing angle is, in one embodiment, as noted, is approximately 50° to accomplish moisture discrimination. A lower index glass may be used, for example, BK7 glass, and the object plane viewed at a lower angle, for example, at an angle of approximately 65°, to accomplish FTIR for skin and water applied to the object plane. Other transparent materials, glass or plastics, for instance, may be used in place of these specific glasses.

In certain embodiments, the mirror system 36 includes fold mirrors 42, 46 and 48. The mirrors reflect light, as shown, of a wavelength, such as about 450 to 650 nm, produced by the illumination source 18.

The unique combination of objective lens 22 and field lens 24 design accomplishes telecentricity of rays applied to the object plane and optimizes Modulation Transfer Function (MTF) at the bottom of the field of view while simultaneously keeping MTF sufficiently high elsewhere in the field of view. The object plane is illuminated through the illumination face of the prism at an angle approximately equal to the viewing angle (35-50 degrees).

In certain embodiments, the illumination source or means 18 is reduced substantially in thickness to provide a large undercut (area 20) beneath the illumination face of the prism to accommodate finger position during rolling fingerprint capture.

According to various embodiments, the illumination source 18 is a unique light panel or device. In certain embodiments, the illumination source includes a panel constructed of a printed circuit assembly having a multiplicity of small (approx. 1.6 mm×0.8 mm×0.6 mm) light emitting diodes (LEDs) with broad spectrum illumination (approximately 140-160 degree half intensity profile). The light source further includes a light diffusing plate including a thin acrylic substrate approximately 0.125 inches thick with light shaping diffusers on each surface to receive the light from the LEDs and project it onto surface 14 in a uniform manner. Light shaping diffusers such as those available from Luminit or Vikuiti offering circular and/or elliptical patterns may be used. The diffuser focal point determines the thickness of the acrylic plate. The illumination source described provides a thin profile, necessary to provide the required finger positioning feature and provides broad illumination across a wide area necessary to illuminate the large 5×5 inch field of view. Light pipe illumination techniques that inject light into the sides of a clear acrylic light pipe device do not provide sufficiently uniform illumination, exhibiting bright and dark regions that are difficult to compensate to achieve the required background illumination uniformity. White light LEDs or monochromatic LEDs may be employed since the lens system is constrained to pass a narrow wavelength band (such as blue, red, or green spectrum). This permits the use of white light which is more pleasing to the eye than typical monochromatic light sources (such as green or red) which some users of the product find objectionable with long term use.

Figure 2:
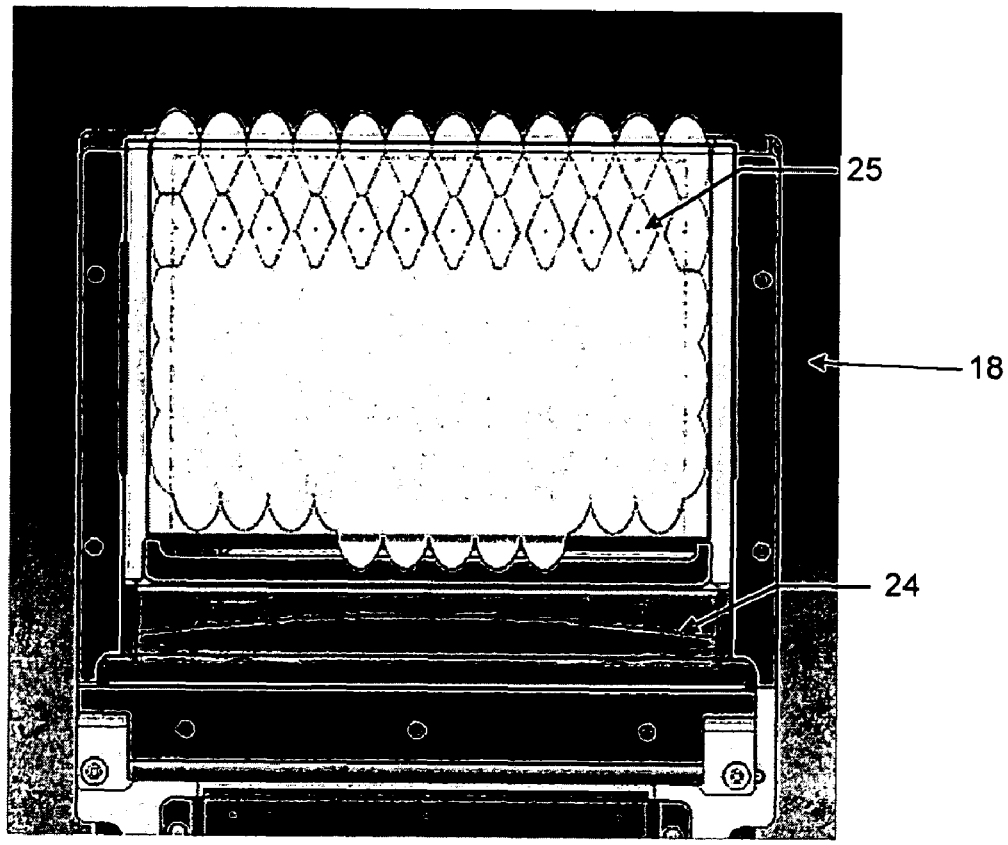
FIG. 2 schematically illustrates a top view of an illumination source according to certain embodiments of the present invention.
Figure 3:
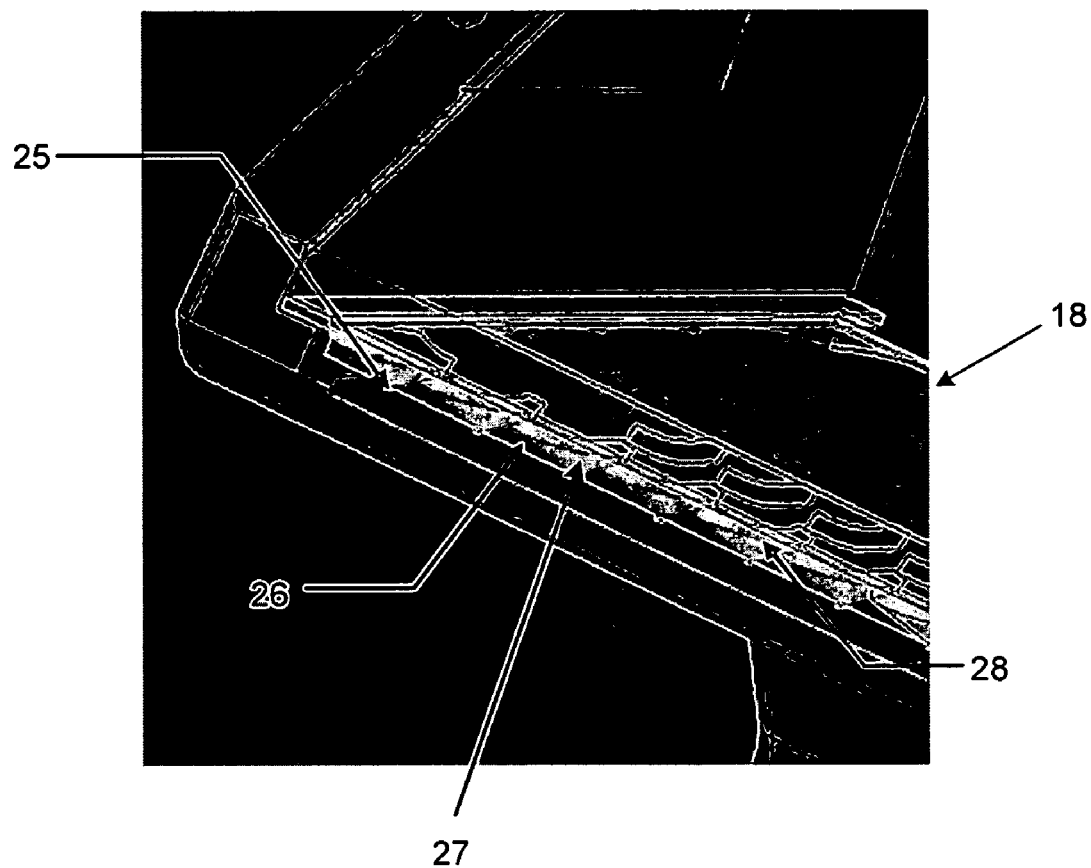
FIG. 3 schematically illustrates an oblique view of the illumination source depicted in FIG. 2.
Figure 4:
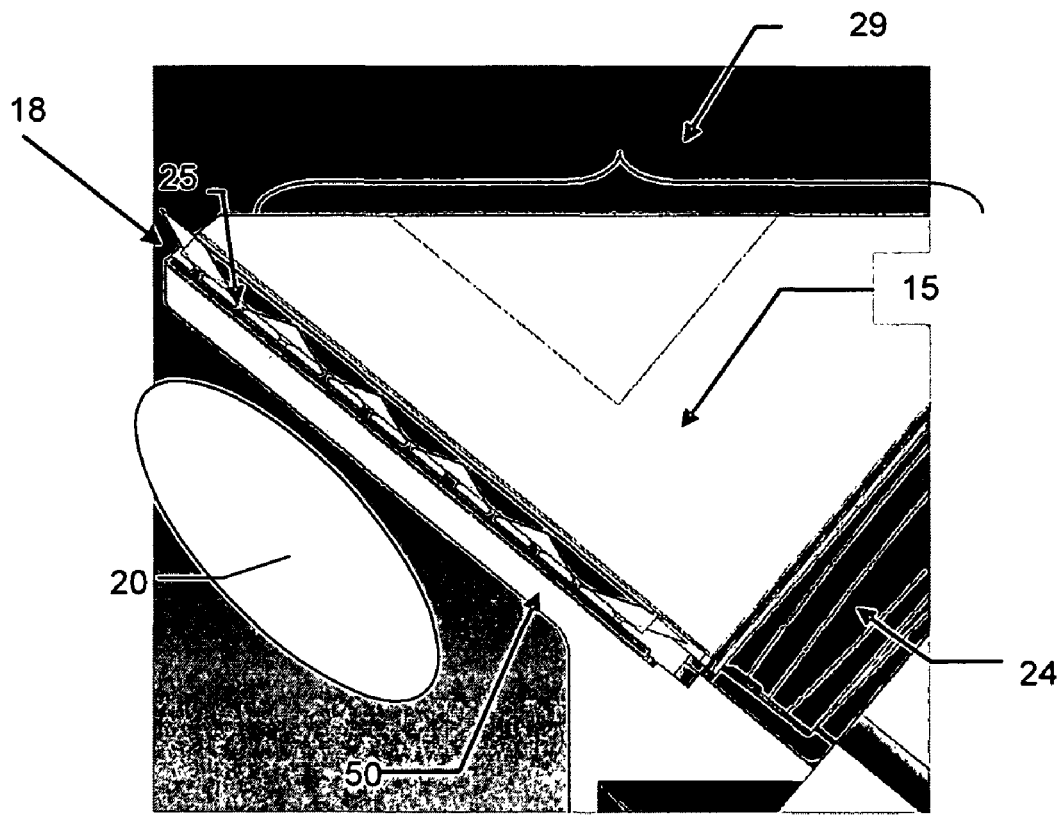
FIG. 4 schematically illustrates a side view of the illumination source depicted in FIG. 2.

FIGS. 2 and 3 illustrate views of the light panel or light source 18 according to various embodiments; FIG. 2 shows a view of the light panel through the top of the prism 15 and FIG. 3 shows an oblique view of light panel 18. Field or primary lens 24 is shown in FIG. 2. The LED pattern projected onto the diffuser plate is shown schematically; one LED 25 in array of multiple LEDs is indicated. FIG. 3 shows the printed circuit assembly 28 with a diffuser panel 26 and LED profile projections 27 shown. In this embodiment over 100 LEDs are employed to achieve illumination uniformity. FIG. 4 shows a side view of light panel 18 and prism 15 and field lens 24 inside a case 50. The vertical field of view is indicated at 29. A large region 20 or ergonomic undercut outside the case is available for finger positioning while rolling fingers. The thin profile of light panel 18 makes possible the room 20 available for finger and thumb placement when rolling fingerprints. It is important to provide ample room beneath the prism for finger positioning while rolling fingerprints to avoid fingers hitting the case and causing the rolled finger to move in an undesirable manner resulting in smear of the fingerprint.

Figure 5:
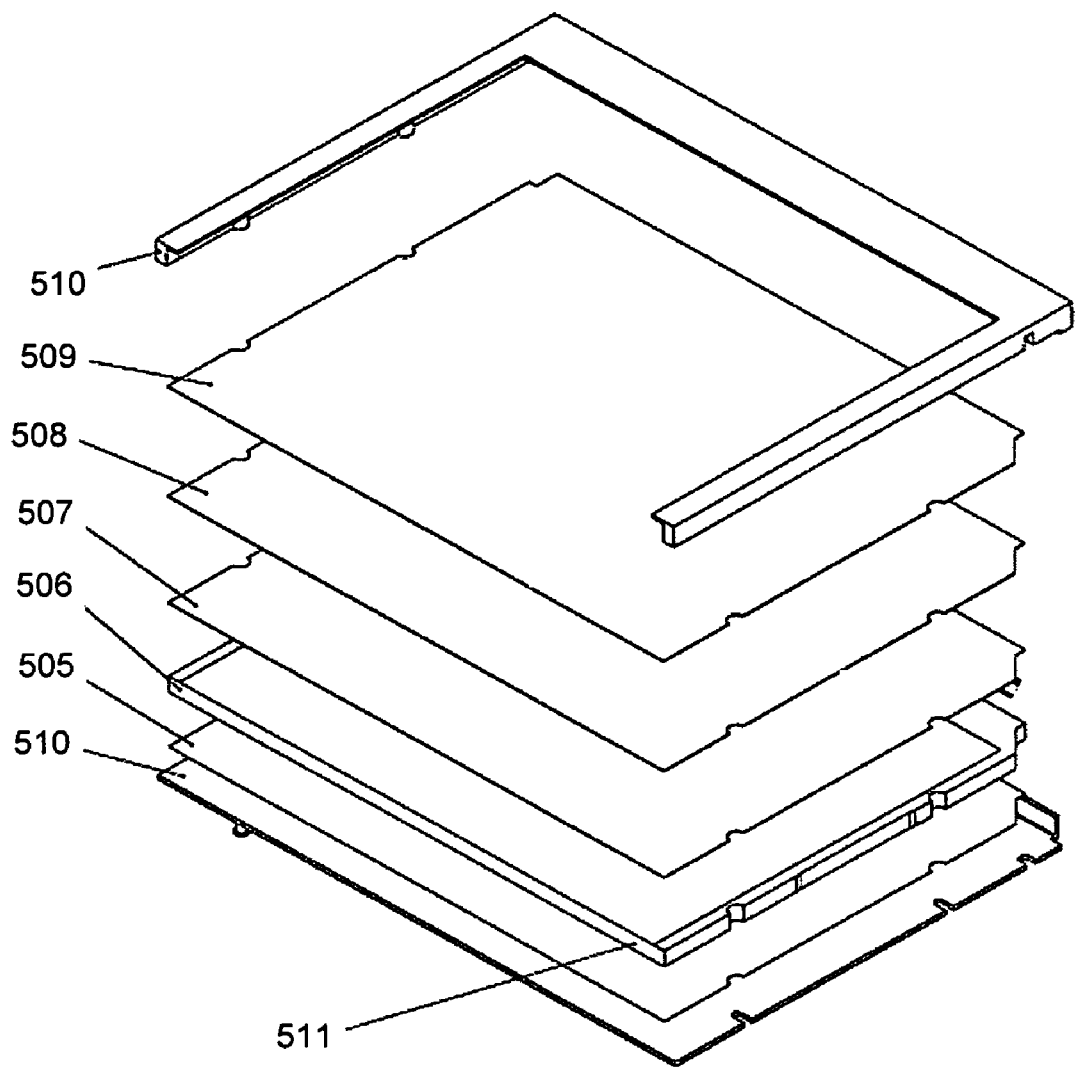
FIG. 5 schematically illustrates the arrangement of various components of an illumination source according to certain embodiments of the present invention.

In another embodiment, the illumination source 18 is a backlight panel assembly including a light pipe. FIG. 5 shows a various components of such an assembly. A printed circuit board (not shown for clarity) includes LEDs to provide light and is located between light guide or pipe 506 and back reflector 505. Heat transfer foil 511 on light guide 506 is also shown. Light emitted from the LEDs travels either to light guide 506, which directs it to diffuser plate 507, or to back reflector 505 where it is reflected back to pipe or guide 506 and diffuser plate 507. Prism films 508 and 509 are applied to the upper surface of the diffuser plate 507. One or more such prism films may be used, including film brightness enhanced films (BEF) or other films including reverse prism and polarization film such as DBEF may also be employed to diffuse and brighten the illumination. As with the embodiment described above, white light LEDs or monochromatic LEDs may be employed in the light panel since the lens system is constrained to pass a narrow wavelength band (such as blue, red, or green spectrum). This permits the use of white light which is more pleasing to the eye than typical monochromatic light sources (such as green or red) which some users of the product find objectionable with long term use. A housing 510 encloses the panel. Unlike light panels in previous scanners that employ light pipes, the panel depicted in FIG. 5 is very thin due to the use of backlit LED technology.

As indicated above, in certain embodiments, the light panel display is thin enough to permit the scanner housing to fit along the front angle of the prism 15, thereby allowing space for finger and hand positioning during rolling fingerprint capture. In certain embodiments, the light panel is between ⅛-⅜ inches in thickness.

Figure 6:
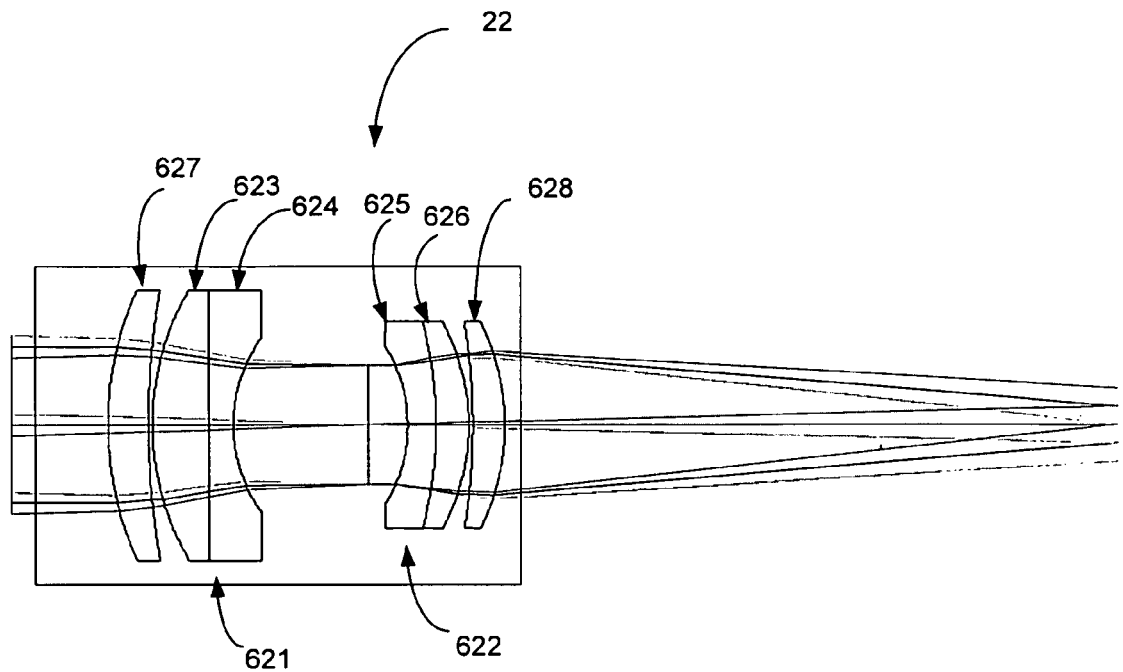
FIG. 6 schematically illustrates elements of an objective lens system according to certain embodiments of the present invention.

The optics scheme, including the telecentric field lens 24 and objective lens system 22, permits imaging over the larger field of view necessary for palmprints, while allowing imaging over a region of interest. The objective lens system is a multi-element objective lens. FIG. 6 shows an objective lens system 22 according to certain embodiments. As shown in FIG. 6, the objective lens system 601 may include a pair of doublets (achromats): a first doublet 621 and a second doublet 622. The doublet 621 includes lenses 623 and 624. The doublet 622 also includes two lenses 625 and 626 configured in a similar fashion. Each doublet functions as an achromatic lens, thereby removing a substantial portion of chromatic aberration. That is, the doublets provide lateral and axial color correction for the wavelengths of interest, for example, about 600 to 650 nm in one embodiment. The objective lens system 601 also includes two singlet lens: a first singlet lens 627 and a second singlet lens 628. The lens mechanism also provides an aperture stop in certain embodiments.

In a specific embodiment, the objective lens system is a 6-element system with the following specifications:
Magnification: 3.479× (image to object plane)
Aperture Stop: 15.0 Diameter; Fixed
Spectral Range: 625 nm+/−20 nm; Diffuse Red Light
Spectral Weighting: 1.0 @ 625 nm; 0.5 @ 605 and 645 nm
FOV: 127.0×84.9 (Diag.=152.8) in Object Space
   36.48×24.384 (Diag.=43.88) in Image Space
Distortion: 0.008% (Nominal)+/−0.20% in Object Space
Field Curvature Flat Field
Resolution Limit: 55 cy/mm COF(Nominal) in Object Space; (190 cy/mm COF in Image Space)
MTF: >30% @ 25 cy/mm (Sine Wave Response) Anywhere in FOV
Transmission: >85%
Objective Lens OAL: 48.928 Vertex to Vertex
Track Length: 703.882 (Image to Object)
Lens Barrel Length: 60.0+/−0.25 (Includes additional length for possible filter at large end)
Lens Barrel Diameter: 40.00+/−0.050
First Singlet Lens: radius: 29.300 mm cx, 81.280 mm cc; edge diameter 26.000 mm; thickness 4.000 mm; material: SK2
Second Singlet Lens: radius: 102.900 mm cc, 42.093 mm cv; edge diameter 34.000 mm; thickness 5.000 mm; material: SK2
First Doublet Lens: radius: 27.860 mm cx, 50.800 mm, 19.230 mm cc; edge diameter 26.000 mm, 26.000 mm, thickness 4.000 mm, 3.5 mm; material: SK4, F8
Second Doublet Lens: radius: 19.230 mm cc, plano, 34.000 mm cx; edge diameter 34.000 mm, 34.000 mm, thickness 3.000 mm, 7.000 mm; material: F8, SK4

Other multi-element objective lens systems may be used to achieve front and back focal lengths of different dimensions and smaller blur spots for increased performance at a higher cost. For example, a seven element lens comprised of three singlets and two doublets or a variant comprised of three singlets, one doublet, and a singlet with a high degree of curvature may be used according to various embodiments.

The object plane field of view is thus mapped to the image sensor system 38 through color corrected optics, including the fold mirrors. The optics configuration is telecentric at both the object plane and the image plane to provide a broad region of high optical performance, exhibiting small blur spots throughout the FOV for the chosen color wavelengths. The vertical FOV, in various embodiments, may be between about 2 and 5 inches. In certain embodiments, the image sensor system 38 includes a single monochrome CMOS imager. In other embodiments, multiple imagers may be used. Also color imagers may be used, e.g., a single or multiple high pixel density color CMOS imager(s) may be used with a white LED light source and color corrected optics, or may be used with a with monochromatic light source with color corrected lens. In certain embodiments, one or more CCD imager is used instead of CMOS imager(s). Also in certain embodiments, a 14 Mpel monochrome imager is used. A CMOS or CCD monochrome imager of greater than 14 Mpel may also be used. In certain embodiments, a 12 Mpel imager is used and the imager is mechanically dithered in steps smaller than ½ pixel to construct a raw image which may be formatted to a final 1000 ppi image. Similarly, in certain embodiments, an imager smaller than 12 Mpel is used and the imager is mechanically dithered in steps smaller than ½ pixel to construct a raw image which may be formatted to a final 500 ppi image.

The image sensor or sensors provide digital output data at frame rates of about 12 frames per second or greater. The frame rate is high enough to avoid artifacts (e.g., 12 frames/second (fps) for roll prints, greater than 8 fps for slap prints and 4 fps for palm images). The sensors are tilted to accomplish Scheimpflug correction of trapezoidal image distortion and variation in focus in vertical FOV caused by the steep viewing angle.

Figure 7:
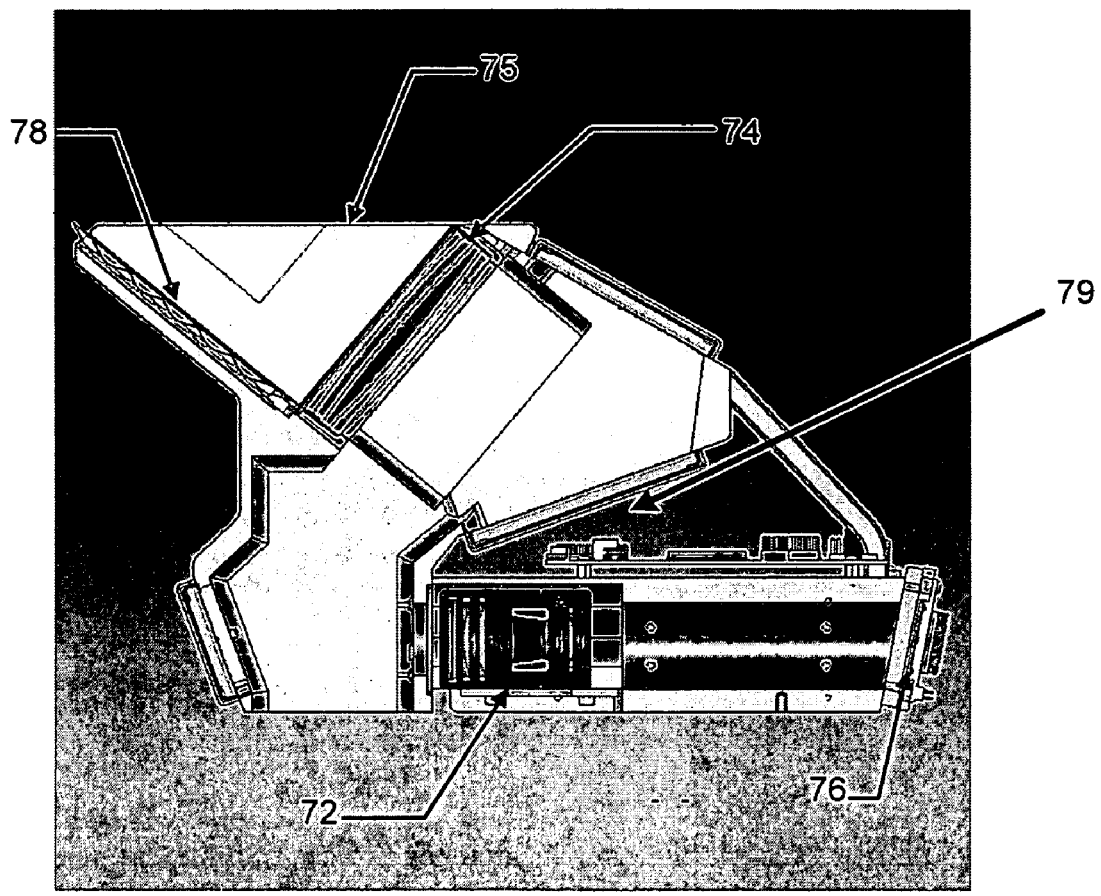
FIG. 7 illustrates an opto-mechanical embodiment of the system according to certain embodiments of the present invention.
Figure 8A:
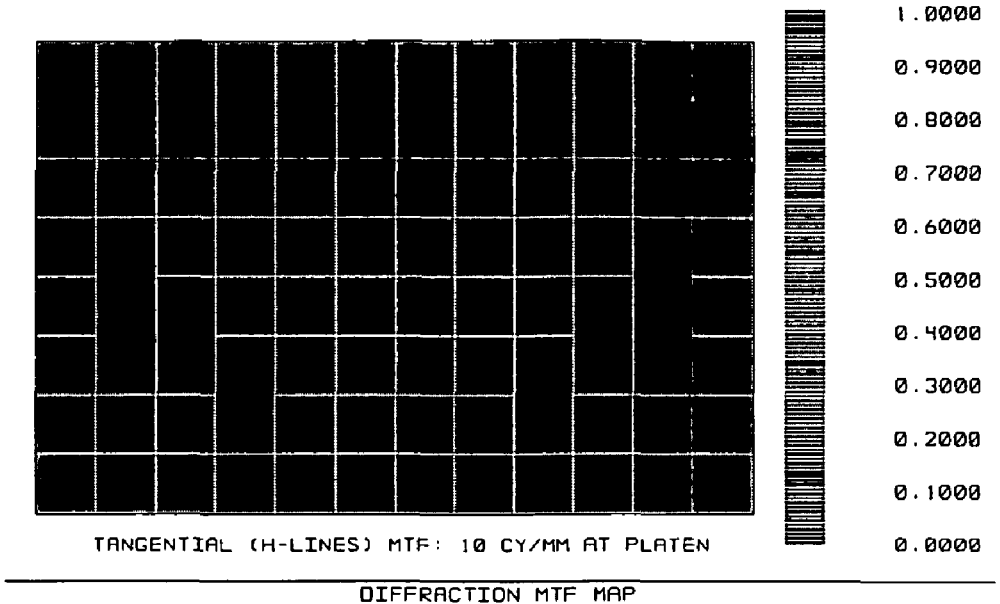
FIGS. 8A and 8B show modulation transfer function (MTF) profiles over a field of view of an imaging system according to certain embodiments of the present invention.
Figure 8B:
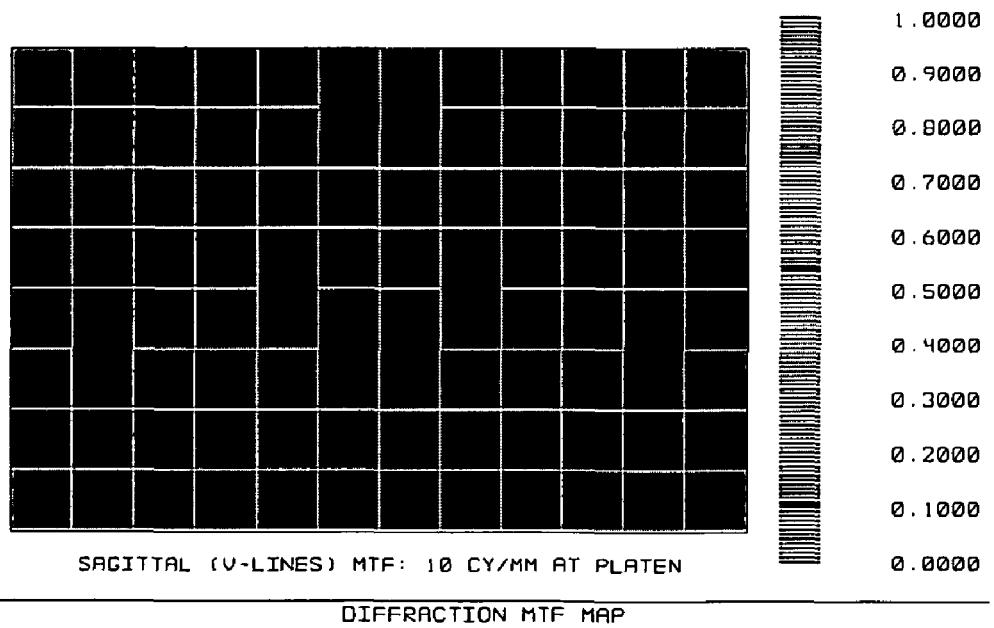

FIG. 7 illustrates an opto-mechanical embodiment of the system. The principle elements are illustrated in a cut-away view: light panel 78, prism 75, field lens 74, objective lens 72 and camera assembly 76. Also shown is the embedded DSP computer printed board assembly 79 that controls image capture and provides communication to a host computer. To achieve the desired image sharpness (MTF) throughout the field of view, the objective lens system is designed with a unique prescription to achieve high MTF throughout the field of view, but with a bias to the lower region where rolled fingerprints are captured. FIGS. 8A and 8B show MTF profiles over the field of view. The bias toward the bottom of the FOV is shown.

In certain embodiments, the system is configured to roll fingerprints in the center of the lower region for highest performance. However, the MTF performance supports rolling in either corner for acceptable results. MTF in excess of 30% at 10 cycles per mm represents specification compliant results.

Figure 9:
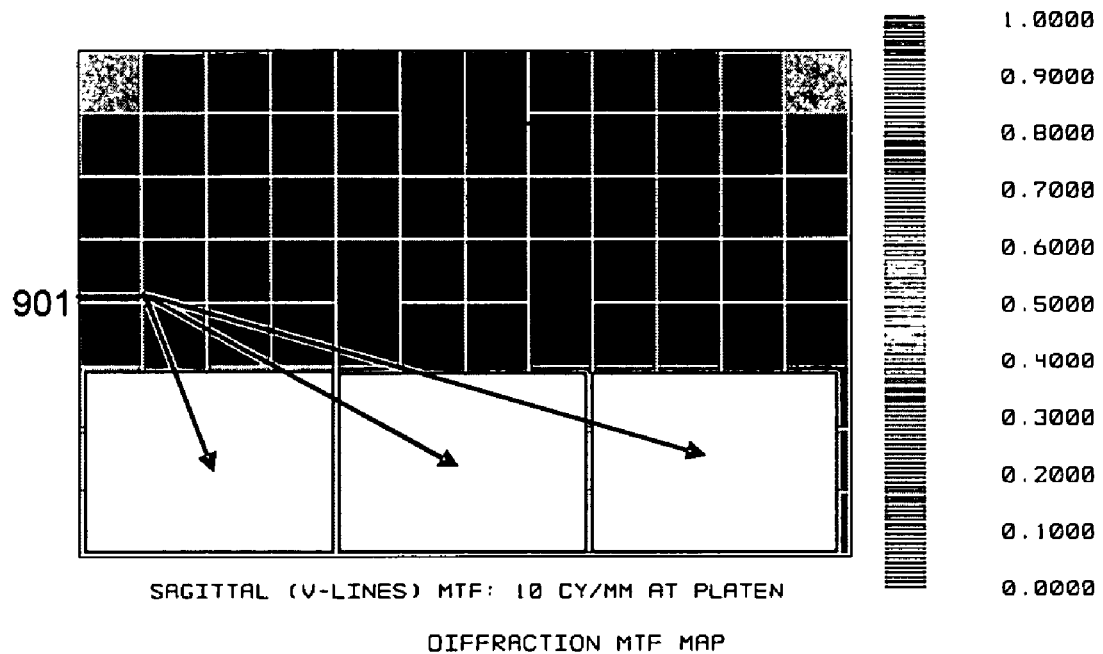
FIG. 9 shows possible roll regions overlaying a modulation transfer function (MTF) profile of a field of view of an imaging system according to certain embodiments of the present invention.

FIG. 9 illustrates the possible regions 901 which may be selected for rolling fingerprints. The area required for rolling is 1.6 (w) by 1.5 (h) inches. Dimensions shown are approximate. Note that the field of view illustrated is a map of the object plane (about 5×5 inches) mapped onto the imager. The aspect ratio shift of the near-square field of view is a function of viewing the object plane through the prism at the TIR angle.

Particular embodiments of the system employ a 14 Mpel rolling shutter monochrome CMOS imager (IBIS4-14000) manufactured by Cypress Semiconductor. This device provides region of interest addressability with frame rate increase when the region of interest is smaller than the full field of view. However, the frame rate increase is a function of where the region of interest is selected. In the example shown in FIG. 9, the highest increase in frame rate is accomplished when the ROI is selected as the lower left corner. As the region of interest is moved to the right, the frame rate decreases to a minimum and then increases again in the lower right corner. Therefore, performance is optimum in the corners. Various embodiments of the system permit the assignment of the roll region of interest in any area across the bottom of the major field of view without ergonomic impediment.

A larger region of interest than shown for rolled fingers may also be assigned for capturing 4-finger slaps (typically 3.2×3.0 inches or 3.2×2.0 inches). This is desirable for increasing frame rate and thereby minimizing motion effects when capturing slap images.

The optics prescription of the system is designed for small blur spot performance, on the order of 25 microns. This supports two performance advantages: (1) very high contrast when using an imager providing over-sampling of the field of view such as when the system output is specified at 500 ppi, and (2) good contrast when the system is designed for 1000 ppi output. In certain embodiments, for 1000 ppi output, the imager may be mechanically dithered by ½ pixel in the horizontal and vertical directions with an image captured at each position. The 4 images may then be combined with pixels interleaved for use in forming a 1000 ppi image without aliasing and with high MTF at 20 cycles/mm features at the object plane.

In one embodiment, a 14 Mpel image with 4536 (h)×3024 (v) pixels supports a raw image format of approximately 900 pixels per inch horizontal×600 pixels/inch vertical. This raw, high MTF image is then scaled to 500 ppi exhibiting very high contrast.

To achieve flexibility in assigning region of interest for roll capture, optimize image capture in any area of interest, and provide optimal image processing in each region of interest, an embedded DSP computer 30 is provided as specified in the system design.

The DSP computer receives the camera output data, forms fingerprint images that conform to FBI specified requirements, and outputs the images to a host computer for assembly into a "record" comprised of a set of images and textual data. The system is illustrated in FIG. 10.

Figure 10:
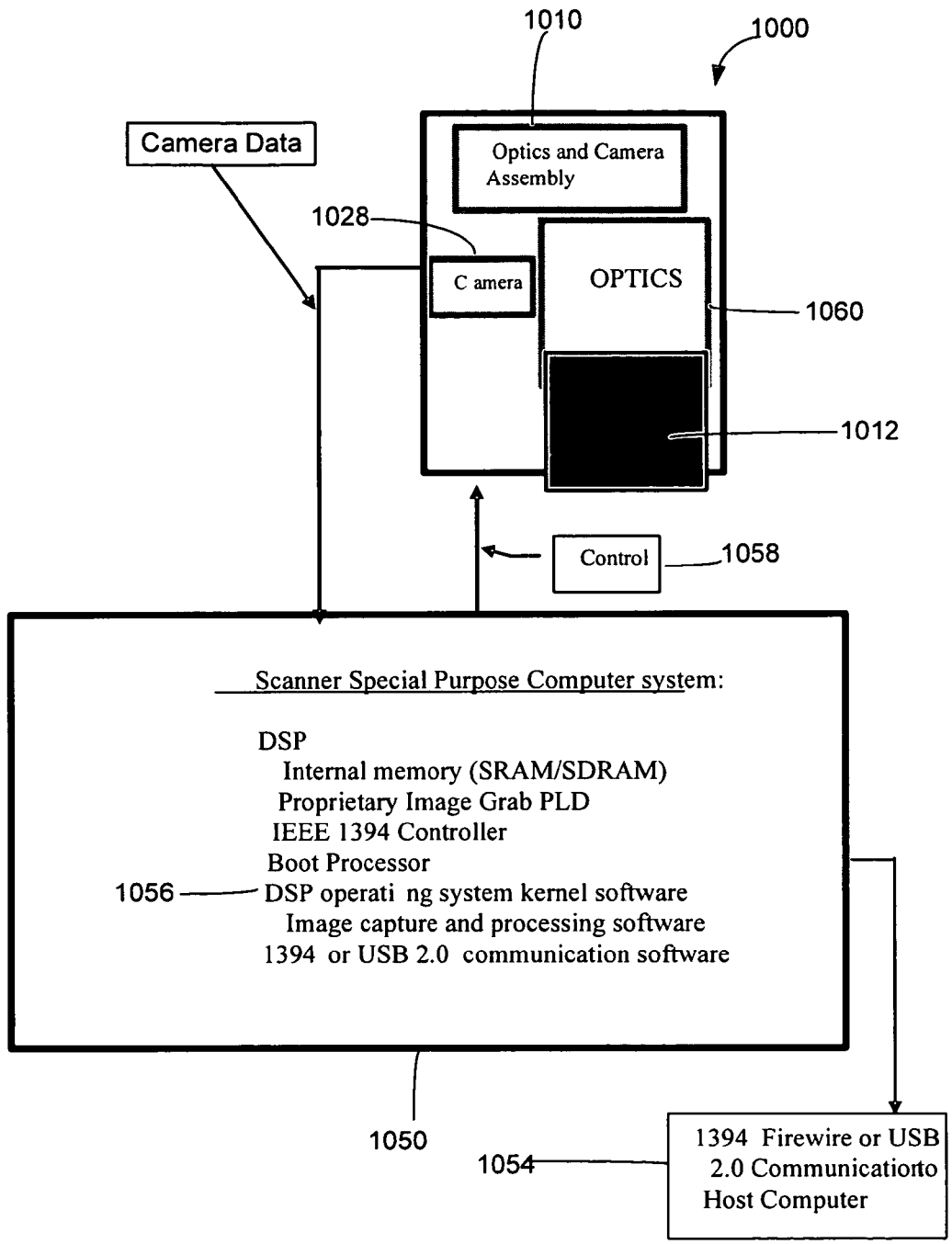
FIG. 10 schematically illustrates a processing system for the imaging system of FIG. 1.

As shown in FIG. 10, processing of image data, from imager or camera 1028, derived from imaging surface 1012, is accomplished in a special purpose digital signal processing (DSP) computer 1050. The computer 1050 receives image output data from the fingerprint/palmprint image sensor or imager 1028. This processed image data conforms to the FBI specified requirements, for example, the FBI Appendix F specifications. The processed images are outputted to a host computer (not shown) via an IEEE 1394 Firewire link 1054 for assembly into a record comprised of a set of images and textual data. An image grab of the computer 1050 may be implemented using a technique such as that described in U.S. Pat. No. 5,748,766, entitled "Method and Device for Reducing Smear in Rolled Fingerprint Image," or the technique described in U.S. Pat. No. 4,933,976, entitled "System for Generating Rolled Fingerprint Images", assigned to the assignee of the subject application, and which are herein incorporated by reference.

The computer 1050 also controls, as represented by control box 1058, the operation of the image sensor system 1028 and including optics and camera assembly 1010. The optics of the imaging system 1000 are represented by box 1060. In another embodiment, data may be transferred to the host computer prior to processing into final fingerprint form. The final fingerprint processing would then be accomplished in software or a combination of hardware and software on the host computer. Also, an optional hand scanner may be used in conjunction with the imaging system 1000. The hand scanner operates under a control of the computer 1050. The computer receives image output data from the hand scanner. The hand scanner may be of the type described in U.S. Pat. No. 6,175,407, entitled "Apparatus And Method For Optically Imaging Features On The Surface Of A Hand", assigned to the assignee of the subject application, and which is herein incorporated by reference.

A number of implementations and techniques have been described. However, it will be understood that various modifications may be made to the described components and techniques. For example, advantageous results still could be achieved if steps of the disclosed techniques were performed in a different order, or if components in the disclosed systems were combined in a different manner, or replaced or supplemented by other components.

For example, the optical layout of the imaging system may use only one fold mirror or two fold mirrors. It is also possible, in one embodiment, to eliminate the fold mirrors entirely by either reducing the front and back focal length or the objective lens and/or packaging the optics system in a longer housing. The objective lens system may comprise some lens combination other than two pairs of doublets and two singlets. For instance, a combination of three pairs of doublets may be used to provide higher CTF over a larger FOV. Also, objects other than a finger may be imaged by the imaging device.

Additionally, instead of one imager, multiple imagers may be employed. In another configuration, the light source as discussed, may be multi-color providing more then one wavelength of light through color-corrected optics to stimulate more than one pixel color at the CMOS or CCD imaging device. For example, a CMYK (cyan-magenta-yellow-black) imager might be efficiently illuminated with a light source that would stimulate three of the four imager colors, but not the fourth. The color correction in the optics would be easier by virtue of the smaller spread of wavelengths that would have to be supported and the illumination could be accomplished with bi-color LEDs.

A number of embodiments of the invention have been described. Nevertheless, it will be understood that various modifications may be made without departing from the spirit and scope of the invention.

The invention claimed is:

1. A system for optically imaging an object in a field of view comprising:
   an optical platen having an object receiving surface;
   a light source positioned to illuminate the object receiving surface;
   an imaging system having an image plane and positioned to receive light from the object receiving surface to form an image of the object on the object receiving surface; and
   a lens mechanism to focus light from the object receiving surface onto the image plane, wherein the system is configured to capture an image within a full field of view and to capture a region of interest within the field of view and wherein the lens mechanism is a six-element lens.

2. The system of claim 1 wherein the object is a hand.

3. The system of claim 2 wherein the system is configured to capture at least a palmprint image and a fingerprint image.

4. The system of claim 1 further including a folding mirror to direct light from the object receiving surface to the lens mechanism.

5. The system of claim 4 wherein there are three folding mirrors.

6. The system of claim 1 wherein the imaging system further includes a monochromatic CMOS imager.

7. The system of claim 1 wherein 500 and 1,000 pixels per inch images are produced.

8. The system of claim 1 wherein the light source is a monochromatic light source.

9. The system of claim 1 wherein the light source comprises a backlight panel assembly including a light pipe.

10. The system of claim 1 wherein the light source comprises a panel having a thickness of no more than ⅜ inch.

11. The system of claim 1 further comprising a region below the light source for hand or finger and thumb positioning.

12. A system for optically imaging a hand comprising:
    an optical platen having an object receiving surface;
    a light source positioned to illuminate the object receiving surface;
    an imaging system having an image plane and positioned to receive light from the object receiving surface to form an image of the object on the object receiving surface; and
    a lens mechanism to focus light from the object receiving surface onto the image plane, wherein the system is configured to capture a palm image and a fingerprint image and wherein the lens mechanism includes two doublets and a pair of singlets.

13. The system of claim 12 wherein the system is configured to capture at least a palm image and rolling fingerprint images.

14. The system of claim 12 further comprising a region below the light source for thumb or finger positioning.

15. The system of claim 12 wherein each of the x and y dimensions of the object receiving surface are at least about 5 inches.

16. A method of imaging a hand comprising:
receiving the hand at an object receiving surface of an optical platen;
illuminating the object receiving surface with a light source;
collecting light from the object receiving surface; and
focusing the collected light onto an image plane of an imaging system using a lens mechanism including a six-element lens or a pair of doublets and a pair of singlets to form an image of the hand, wherein the image comprises an image of a palm of the hand and at least a finger of the hand.

17. A system for optically imaging an object in a field of view comprising:
an optical platen having an object receiving surface;
a light source positioned to illuminate the object receiving surface;
an imaging system having an image plane and positioned to receive light from the object receiving surface to form an image of the object on the object receiving surface; and
a lens mechanism to focus light from the object receiving surface onto the image plane, wherein the system is configured to capture an image within the field of view and to capture a region of interest within the field of view and wherein the lens mechanism includes a six-element lens or two doublets and a pair of singlets.

18. The system of claim 17 further including three folding mirrors to direct light from the object receiving surface to the lens mechanism.

* * * * *